United States Patent
Kawamata et al.

(10) Patent No.: US 9,399,754 B2
(45) Date of Patent: Jul. 26, 2016

(54) PROCESS FOR PRODUCING FLAVOR ENHANCER FOR BEER AND BEER-LIKE BEVERAGE AND BEVERAGE OF A ROAST MATERIAL

(75) Inventors: Shinji Kawamata, Hiratsuka (JP); Eiji Emoto, Hiratsuka (JP); Osamu Nozaki, Hiratsuka (JP)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 252 days.

(21) Appl. No.: 12/374,067

(22) PCT Filed: Aug. 9, 2007

(86) PCT No.: PCT/JP2007/065920
§ 371 (c)(1),
(2), (4) Date: Jan. 16, 2009

(87) PCT Pub. No.: WO2008/018627
PCT Pub. Date: Feb. 14, 2008

(65) Prior Publication Data
US 2009/0317511 A1    Dec. 24, 2009

(30) Foreign Application Priority Data
Aug. 11, 2006 (JP) .................... 2006-220244

(51) Int. Cl.
C12C 5/02        (2006.01)
A23L 1/105       (2006.01)
A23L 1/22        (2006.01)
C12G 3/06        (2006.01)

(52) U.S. Cl.
CPC ............... *C12C 5/026* (2013.01); *A23L 1/1055* (2013.01); *A23L 1/22* (2013.01); *C12G 3/06* (2013.01)

(58) Field of Classification Search
CPC ........ A23L 1/1055; C12G 3/06; C12C 5/026; A23L 1/22
USPC .................................... 426/18, 533, 590, 592
See application file for complete search history.

(56) References Cited

U.S. PATENT DOCUMENTS

| | | | |
|---|---|---|---|
| 3,711,292 A | 1/1973 | Sfat et al. | |
| 4,366,173 A | 12/1982 | Parker | |
| 4,377,602 A | 3/1983 | Conrad | |

FOREIGN PATENT DOCUMENTS

| | | |
|---|---|---|
| DE | 4026302 A1 | 5/1991 |
| GB | 1303644 A | 1/1973 |
| GB | 1345413 A | 1/1974 |
| GB | 1474807 A | 5/1977 |
| JP | 06-078740 A | 3/1994 |
| JP | 2005-13166 A | 1/2005 |
| WO | 2004041003 A1 | 5/2004 |

OTHER PUBLICATIONS

Briggs, Dennis E.; Boulton, Chris A.; Brookes, Peter A.; Stevens, Roger (2004). Brewing Science and Practice. (pp. 11-51). Woodhead Publishing. Online version available at: http://www.knovel.com/web/portal/browse/display?_EXT_KNOVEL_DISPLAY_bookid=1249&VerticalID=0.*
International Search Report Issued Oct. 18, 2007.
European Office Action dated Aug. 10, 2010, in corresponding EP Application No. 07792554.3.
Chinese Office Action dated Oct. 13, 2011 issued by the State Intellectual Property Office of P.R. China in counterpart Chinese Application No. 200780029858.9.
The State Intellectual Property Office of P.R. China, Chinese Office Action dated Jan. 9, 2013 issued in counterpart Chinese application No. 200780029858.9.
Kan et al., "Study on Separation of beta-Glucan from Barley", Journal of Anhui Agricultural Sciences 2005, 33(5): pp. 867-868.
Hou, "Purification and Identification of Polysaccharide in Barley", Shanxi Food Industry, Sep. 1999, pp. 47-48.
Jiang et al. "Food Chemistry", Chemical Industry Press, Jan. 2005, p. 214.
European Patent Office, Communication dated Sep. 26, 2013 issued in corresponding European Application No. 07792554.3.

* cited by examiner

Primary Examiner — Vera Stulii
(74) Attorney, Agent, or Firm — Sughrue Mion, PLLC

(57) ABSTRACT

The present invention relates to a process for producing a flavor enhancer for beer and beer-like beverage and beverage of a roast material, which includes (1) heating a grinded matter of a cereal, (2) treating the grinded matter with protease, and (3) recovering an extract; and a flavor enhancer for beer and beer-like beverage and beverage of a roast material obtainable by the process. The flavor enhancer of the invention can be used for enhancing the full body and enhancement of beer and beer-like beverage and beverage of a roast material.

12 Claims, No Drawings

PROCESS FOR PRODUCING FLAVOR ENHANCER FOR BEER AND BEER-LIKE BEVERAGE AND BEVERAGE OF A ROAST MATERIAL

TECHNICAL FIELD

The present invention relates to a process for producing a flavor enhancer for beer and beer-like beverage and beverage of a roast material, which includes a step of recovering an extract from a protease-treated grinded matter of cereals.

BACKGROUND OF THE INVENTION

Various types of beer have been produced and drunk from the past in many countries in the world. With the recent diversification of consumers' taste and lifestyle change, not only the types of beer but also those of low-malt beer, beer-like alcoholic beverages and low-alcohol beer have been diversified, and a variety of such beverages have been produced.

With such a trend, in order for commercial product differentiation, some materials capable of imparting an additional flavor or taste to food and beverage or capable of enhancing the original flavor or taste of food and beverage have been desired. In particular, beer-like alcoholic beverages and low-alcohol beer has been desired to have a full body and enhancement for their commercial value differentiation, and a novel flavor enhancer enabling such a demand has been desired.

Additionally, also for beverages of a roast material such as coffee and barley tea, a flavor enhancer capable of imparting full body and enhancement thereto has been desired, as in the case of beer and beer-like beverages.

For example, a method of producing beer having an improved flavor, which includes adding protease in a step of preparing beer brewing wort, has been disclosed (see, JP-A-6-78740; Patent Reference 1).

Also known is a flavor improver for beer-like beverages, which contains an extract obtained through extraction of malt with a mixed solution of water and ethyl alcohol and which is added to beer-like beverage such as low-malt beer for imparting and enhancing its malt flavor and voluminous taste (see JP-A 2005-13166; Patent Reference 2).

Such conventional technique (see, JP-A 2005-13166; Patent Reference 2) may be effective in some degree for flavor or taste impartation or enhancement, but is not always satisfactory; and further development of a more excellent flavor enhancer has been desired.

Patent Reference 1: JP-A-6-78740
Patent Reference 2: JP-A-2005-13166

DISCLOSURE OF THE INVENTION

An object of the invention is to provide a process for producing a flavor enhancer capable of imparting desired full body and enhancement to beer and beer-like beverage and beverage of a roast material, when it is added to the beer and beer-like beverage and beverage of a roast material.

The present inventors have made intensive studies for the purpose of solving the above-mentioned problems, and found a process for producing a flavor enhancer capable of imparting desired full body and enhancement to beer and beer-like beverage and beverage of a roast material, which includes treating a grinded matter of cereals with protease. As a result, the inventors have completed the present invention.

Specifically, the invention relates to the following items 1 to 8.

1. A process for producing a flavor enhancer for beer and beer-like beverage and beverage of a roast material, which comprises:
   (1) heating a grinded matter of a cereal;
   (2) treating the grinded matter with protease; and
   (3) recovering an extract.
2. The process according to item 1, wherein the cereal is at least one member selected from the group consisting of Japanese barnyard millet, foxtail millet, pearl barley, buckwheat, defatted wheat germ, malt, grain amaranth, rolled barley germ, rice germ, oatmeal, carob, rye, rice, green pea, and brown rice.
3. A flavor enhancer for beer and beer-like beverage and beverage of a roast material, which is obtainable by the process according to item 1 or 2.
4. A flavor composition comprising the flavor enhancer for beer and beer-like beverage and beverage of a roast material according to item 3, and a flavor.
5. Food or beverage containing the flavor enhancer for beer and beer-like beverage and beverage of a roast material according to item 3.
6. Food or beverage containing the flavor composition according to item 4.
7. A method for enhancing flavor of beer and beer-like beverage and beverage of a roast material, comprising adding the flavor enhancer for beer and beer-like beverage and beverage of a roast material according to item 3 to the beer and beer-like beverage and beverage of a roast material.
8. A method for enhancing flavor of beer and beer-like beverage and beverage of a roast material, comprising adding the flavor composition according to item 4 to the beer and beer-like beverage and beverage of a roast material.

According to the invention, there are provided food and beverage having excellent taste, to which the full body and enhancement are imparted or enhanced.

BEST MODE FOR CARRYING OUT THE INVENTION

Embodiments of the invention are described below.

The invention provides a process for producing a flavor enhancer for beer and beer-like beverage and beverage of a roast material, which includes the following steps (1) to (3):
(1) a step of heating a grinded matter of a cereal;
(2) a step of treating the grinded matter with protease; and
(3) a step of recovering an extract.

The respective steps are explained below in detail.

(1) Step of Heating Grinded Matter of Cereal

The step (1) is a step of heating a grinded matter of cereal. In the step (1), the grinded matter of cereal may be prepared by dipping a cereal in water and then grinding it with a mill. Additionally, a cereal that is previously milled or grinded into powder may be dipped in water, and the resulting matter may be subsequently heated.

In the course of dipping the cereal in water in the step (1), dipping temperature and dipping time are not particularly limited and may be suitably determined. For example, while stirred or kept static, the cereal may be dipped in water at 0 to 100° C. for 0 minute to 5 hours, preferably at 4 to 90° C. for 10 minutes to 4 hours, more preferably at 4 to 80° C. for 30 minutes to 3 hours.

The amount of water for dipping the cereal therein in the step (1) may be suitably controlled depending on the cereal used. In general, the ratio of cereal/water (by weight) may be from 90/10 to 1/99, preferably from 70/30 to 1/99.

The mill used is not particularly limited so long as it may be any one capable of milling and grinding the cereal, and any ordinary device for use in grinding and milling may be employed. For example, in the case of employing a household mixer, grinded matter of cereal can be prepared by grinding the cereal dipped in water with the mixer for 1 minute.

In the step (1), a grinded matter of cereal is heated whereby the endogenous enzyme in the cereal (enzyme inherently present in cereals) may be deactivated. The heating means may be suitably determined. In general, the grinded matter may be heated at 55° C. to 121° C. for 1 minute to 90 minutes, preferably at 60° C. to 115° C. for 5 minutes to 70 minutes, more preferably at 65° C. to 110° C. for 10 minutes to 60 minutes.

The heating may be conducted either in a closed system or in an open system, but is preferably conducted in a closed system.

Examples of the cereal used in the method of the invention include Japanese barnyard millet, foxtail millet, pearl barley, buckwheat, defatted wheat germ, malt, grain amaranth, rolled barley germ, rice germ, oatmeal, carob, rye, rice, green pea, and brown rice. Among these, preferred are Japanese barnyard millet, foxtail millet, defatted wheat germ, malt, rice germ, carob, rye, and rice. The cereal used in the invention are readily available on the market.

The above-mentioned malt is not particularly limited and is known one obtainable from barley, wheat, rye, oat, and the like. Preferable examples thereof include pilsner malt, ale malt, Munich malt, amber malt, roast malt, chocolate malt, caramel malt, and wheat malt. The above-mentioned carob means one derived from the shells but not the beans of locust bean.

(2) Step of Treatment with Protease

The step (2) is a step of adding protease to the grinded matter of cereal heated in the step (1), thereby hydrolyzing the grinded matter. The protease treatment may be conducted in the presence of one or more kinds of proteases. In the case where two or more kinds of proteases are used, the grinded matter of cereal may be treated with different kinds of protease, or may be first treated with one kind of protease and then further treated with a different kind of protease. Such a treatment mode may be suitably selected depending on the types of the proteases to be used.

The amount of the protease to be used in the step (2) is not indiscriminately defined, as it varies depending on the activity and the kind of the enzyme to be used.

For example, the amount may be from about 0.0001 to 20% by weight, preferably from about 0.001 to 10% by weight, more preferably from about 0.01 to 5% by weight of the grinded matter of cereal.

The reaction condition for the protease treatment in the step (2) may be suitably determined depending on the protease to be used. For example, regarding the reaction temperature and time, the grinded matter may be treated with protease at about 5 to 90° C. for about 0.5 to 96 hours, preferably at about 10 to 85° C. for about 0.5 to 72 hours, more preferably at about 15 to 80° C. for about 1 to 48 hours, while stirred or while kept static. The pH condition is not particularly limited and may be controlled in accordance with the optimum condition of the protease to be used. In general, the protease treatment may be conducted at a pH within a range of from 4.0 to 10.0.

After the hydrolysis with protease, the protease is deactivated upon heating. The heating condition may be suitably determined depending on the protease to be used. For example, heating may be conducted at 55° C. to 140° C. for 1 minute to 180 minutes, preferably at 60° C. to 130° C. for 5 minutes to 120 minutes, more preferably at 65° C. to 121° C. for 10 minutes to 90 minutes.

In general, protease is a generic term for enzyme that catalyzes hydrolysis of peptide bond, and may be classified into endopeptidase and exopeptidase. Endopeptidase is a protease that hydrolyzes the peptide bond present inside a polypeptide chain thereby decomposing it roughly into some peptides. Exopeptidase is an enzyme that hydrolyzes the peptide bond at the amino terminal or carboxyl terminal of the peptide, and is a protease that sequentially releases free amino acids from the terminal of a peptide chain. In the present specification, endopeptidase is referred to as an endo-type protease; and exopeptidase is referred to as an exo-type protease. Such naming is also employed in other patent references (e.g., see JP-A 2005-87017).

The kinds of the protease to be used in the method of the invention are not particularly limited and may be any commercially-available protease. Examples of the endo-type protease for use in the invention include Protease N (manufactured by Amano Enzyme Inc.), Protease NL (manufactured by Amano Enzyme Inc.), Protease S (manufactured by Amano Enzyme Inc.), Proleather™ FG-F (manufactured by Amano Enzyme Inc.), Papain W-40 (manufactured by Amano Enzyme Inc.), Neutrase (manufactured by Novozymes Axtieselsxab), Protamex (manufactured by Novozymes Axtieselsxab), Alkalase™ (manufactured by Novozymes Axtieselsxab), Bromelain (manufactured by Biocon (Japan) Ltd.), Orientase™ 10NL (manufactured by HBI Enzymes Inc.), and Orientase™ 90 (manufactured by HBI Enzymes Inc.).

Examples of the exo-type protease for use in the invention include Umamizyme (manufactured by Amano Enzyme Inc.), Peptidase R (manufactured by Amano Enzyme Inc.), Protease A (manufactured by Amano Enzyme Inc.), Protease P (manufactured by Amano Enzyme Inc.), Protease M (manufactured by Amano Enzyme Inc.), Denapsin 2P (by Nagase Chemtex Corporation), Denazyme™ AP (by Nagase Chemtex Corporation), Flavorzyme (manufactured by Novozymes Axtieselsxab), Sumizyme™ AP (manufactured by Shin-Nippon Kagaku Kogyo), Sumizyme™ MP (manufactured by Shin-Nippon Kagaku Kogyo), Sumizyme™ FP (manufactured by Shin-Nippon Kagaku Kogyo), Sumizyme™ LP (manufactured by Shin-Nippon Kagaku Kogyo), Orientase™ 20A (manufactured by HBI Enzymes Inc.), and Orientase™ ONS (manufactured by HBI Enzymes Inc.).

The origin of the protease for use in the invention is not particularly limited and any protease derived from various microorganisms such as fungi, yeasts or bacteria, or from plants or animals may be suitably selected and used herein.

(3) Step of Recovering Extract

The step (3) is a step of solid-liquid separation of the reaction solution treated with protease in the step (2), thereby removing the solid matter to recover the extract. Examples of the method of solid-liquid separation include various solid-liquid separation methods, such as centrifugation with a centrifuge such as screw decanter, compression with a filter press, and filtration through filter paper membrane or with an ordinary filter aid such as diatomaceous earth. Preferably, one or more of such solid-liquid separation devices are used for the solid-liquid separation, either singly or in combination.

The extract in the invention is a liquid that is obtained through solid-liquid separation of the protease-treated reaction solution in the step (3). Preferably, the pH of the extract is from 2.0 to 8.0, more preferably from 2.5 to 7.5. In addition, BRIX of the extract is preferably from 10.0 to 50.0, preferably from 20.0 to 40.0.

The extract can be used as a flavor enhancer capable of imparting or enhancing tastes such as full body, enhancement and preference to beer and beer-like beverage and beverage of a roast material. Accordingly, the invention provides a flavor enhancer for beer and beer-like beverage and beverage of a roast material. The invention also provides a method for enhancing flavor of beer and beer-like beverage and beverage of a roast material by adding the flavor enhancer for beer and beer-like beverage and beverage of a roast material to the beer and beer-like beverage and beverage of a roast material.

Examples of the beer and beer-like beverage include beer, low-malt beer, beer-like alcoholic beverages, low-alcohol beer, non-alcohol beer, flavored beer and bitter carbonated beverages. The production processes and the materials for the beer and beer-like beverages in the invention are not particularly limited, and they may be produced from any conventional materials in any conventional methods.

The beverage of a roast material in the present invention means beverage that is produced from roasted coffee beans or barley by extracting them with water, in which a part or all of the extract is used. The roasting method is known and not specifically defined, and example thereof include direct fire roasting, hot air roasting, far infrared rays roasting, microwave roasting, charcoal fire roasting and overheated steam roasting. Depending on the degree of roasting, various roast matters are produced, and the beverages extracted from them may have a different flavor and taste depending on the degree of roasting and on the method of extraction.

Examples of the beverage of a roast material include coffee-like beverages such as coffee, coffee beverages, coffee-containing refreshing beverages and milk beverages; and tea beverages such as barley tea, roasted brown rice tea, roasted tea, oolong tea, coarse tea, black soybean tea and loquat tea. Preferred examples thereof include coffee, coffee beverages, coffee-containing refreshing beverages, milk beverages, barley tea, roasted tea and oolong tea.

The flavor enhancer of the invention may be in the form of a mixture with any suitable diluent or carrier. Examples of the diluent and carrier include solid diluents and carriers such as gum arabic, dextrin, glucose and sucrose; and liquid diluents and carriers such as water, ethanol, propylene glycol, glycerin and surfactant.

The flavor enhancer of the invention may be in any form of, for example, powder, granules, liquid, emulsion, or any other form; and it may be, for example, dissolved in ethanol, propylene glycol, glycerin or a mixture thereof.

According to the present invention, it is preferable to further add an additional flavor to the flavor enhancer for beer and beer-like beverage and beverage of a roast material of the invention, to thereby enhance its flavoring potency. Accordingly, the invention also provides a flavor composition containing the flavor enhancer for beer and beer-like beverage and beverage of a roast material together with an additional flavor.

Examples of the flavor include natural flavors such as essential oil, oleoresin, recovered flavor, extract, and isolated flavor; synthetic flavors such as esters, alcohols, aldehydes, and ketones; and mixtures thereof.

The flavor enhancer for beer and beer-like beverage and beverage of a roast material and the flavor composition of the invention may be added to beer and beer-like beverage and beverage of a roast material during their production process. The method of adding the flavor enhancer for beer and beer-like beverage and beverage of a roast material and the flavor composition of the invention to beer and beer-like beverage and beverage of a roast material is not particularly limited, and any conventional method may be suitably employed.

Regarding the timing of adding the flavor enhancer for beer and beer-like beverage and beverage of a roast material or the flavor composition of the invention to beer and beer-like beverage, it may be added, for example, in a step after fermentation in the beverage production process, such as in a ripening step after the fermentation step, in a filtration step after the ripening step, or just before a bottling step.

Regarding the timing of adding the flavor enhancer for beer and beer-like beverage and beverage of a roast material or the flavor composition of the invention to beverage of a roast material, it may be added, for example, in a mixing step, a homogenization step, a bottling step, and a seaming step in the beverage production process.

The amount of the flavor enhancer for beer and beer-like beverage and beverage of a roast material or the flavor composition of the invention to be added to food and beverage is not particularly limited, and may be suitably determined depending on the type of food and beverage. For example, the content of the flavor enhancer for beer and beer-like beverage and beverage of a roast material or the flavor composition in the beer and beer-like beverage and beverage of a roast material may be generally from 0.1 to 100,000 ppm, preferably from 1 to 70,000 ppm, more preferably from 10 to 50,000 ppm.

Preferred examples of food and beverage to which the flavor enhancer for beer and beer-like beverage and beverage of a roast material or the flavor composition of the invention may be added include beer and beer-like beverages (e.g., various types of beer, low-malt beer, beer-like alcoholic beverages, low-alcohol beer, non-alcohol beer, flavored beer, and bitter carbonated beverages); beverages of a roast material (e.g., coffee, coffee beverages, coffee-containing refreshing beverages, and milk beverages, as well as barley tea, roasted brown rice tea, roasted tea, oolong tea, coarse tea, black soybean tea, and loquat tea); frozen desserts (e.g., ice cream, sherbet, and ices); confectioneries (e.g., chewing gum, candies, caramels, chocolates, biscuits, cookies, rice cookies, backed cookies, oiled cookies, semi-fresh cakes, fresh cakes, and snacks), and bread (e.g., loaves of bread, bread rolls, rye bread, French bread, and croissant). Among these, beer and beer-like beverages and beverages of a roast material are especially preferred.

EXAMPLES

The invention is described further concretely with reference to the following Examples. However, the scope of the invention is not limited to these examples.

Example 1

20 g of Japanese barnyard millet powder (manufactured by Genki Town) was dipped in water of 5 times the mass of the powder, at 20° C. After thus dipped for 1 hour, a slurry was obtained. The slurry was heated at 90° C. for 30 minutes for inactivation of the endogenous enzyme and for sterilization, and then 0.12 g of Neutrase (manufactured by Novozymes Axtieselsxab) was added thereto and subjected to enzymatic reaction at 27° C. for 20 hours. After the reaction, it was heated at 115° C. for 60 minutes for deactivating the enzyme.

After the enzyme deactivation, it was cooled, and then centrifuged with a centrifuge (manufactured by Hitachi Koki Co., Ltd.) with a gravity acceleration g of 4000 at 15° C. for 20 minutes, whereby the solid matter was removed from the slurry, and the liquid was recovered. The recovered liquid was filtered through filter paper (5B or 5C, manufactured by Toyo Roshi Kaisha, Ltd.) to obtain a flavor enhancer (1).

Example 2

In the same manner as in Example 1, a flavor enhancer (2) was produced from foxtail millet powder (manufactured by Genki Town).

Example 3

In the same manner as in Example 1, a flavor enhancer (3) was produced from pearl berley powder (manufactured by Natural House).

Example 4

In the same manner as in Example 1, a flavor enhancer (4) was produced from buckwheat powder (manufactured by Iwate Abe Seifun).

Example 5

In the same manner as in Example 1, a flavor enhancer (5) was produced from defatted wheat gem (manufactured by Nisshin Seifun Group Inc.).

Example 6

In the same manner as in Example 1 but excepting that malt (manufactured by Asahi Breweries, Ltd.) was dipped in water at 20° C. and then grinded with a commercially-available juice mixer (manufactured by Matsushita Electric Industrial Co., Ltd.) to obtain a slurry, a flavor enhancer (6) was produced from the malt.

Example 7

In the same manner as in Example 1 but excepting that grain amaranth (manufactured by Hakubaku Co., Ltd.) was dipped in water at 20° C. and then grinded with a commercially-available juice mixer (manufactured by Matsushita Electric Industrial Co., Ltd.) to obtain a slurry, a flavor enhancer (7) was produced from the grain amaranth.

Example 8

In the same manner as in Example 1 but excepting that rolled barley germ (manufactured by Natural House) was dipped in water at 20° C. and then grinded with a commercially-available juice mixer (manufactured by Matsushita Electric Industrial Co., Ltd.) to obtain a slurry, a flavor enhancer (8) was produced from the rolled barley germ.

Example 9

In the same manner as in Example 1 but excepting that rice germ (manufactured by TORYO Co., Ltd.) was dipped in water at 20° C. and then grinded with a commercially-available juice mixer (manufactured by Matsushita Electric Industrial Co., Ltd.) to obtain a slurry, a flavor enhancer (9) was produced from the rice germ.

Example 10

In the same manner as in Example 1 but excepting that oatmeal (manufactured by Nippon Food Manufacturer) was dipped in water at 20° C. and then grinded with a commercially-available juice mixer (manufactured by Matsushita Electric Industrial Co., Ltd.) to obtain a slurry, a flavor enhancer (1) was produced from the oatmeal.

Example 11

In the same manner as in Example 1, a flavor enhancer (11) was produced from carob powder (manufactured by Sakurai Foods Co., Ltd.).

Example 12

In the same manner as in Example 1, a flavor enhancer (12) was produced from rye powder (manufactured by Sakurai Foods Co., Ltd.).

Example 13

In the same manner as in Example 1, a flavor enhancer (13) was produced from rice (Powder Rice C1, manufactured by Glico Foods Co., Ltd.).

Example 14

In the same manner as in Example 1, a flavor enhancer (14) was produced from green pea powder (manufactured by Kodama Foods Co., Ltd.).

Example 15

In the same manner as in Example 1 but excepting that brown rice (manufactured by IRits) was dipped in water at 20° C. and then grinded with a commercially-available juice mixer (manufactured by Matsushita Electric Industrial Co., Ltd.) to obtain a slurry, a flavor enhancer (15) was produced from the brown rice.

Sensory Evaluation 1

0.1 ml of the flavor enhancers of Examples 1 to 15 were respectively added to 100 ml of water, and tested for sensory evaluation by three panelists. In the sensory evaluation test, the samples were compared with a control containing no flavor enhancer and evaluated as follows.

4: extremely enriched
3: enriched
2: enriched in some degree
1: no change
0: weakened The results are shown in Table 1.

TABLE 1

| Example No. | Kind of Cereals | Full Body | Enhancement |
|---|---|---|---|
| Example 1 | Japanese barnyard millet | 4 | 4 |
| Example 2 | foxtail millet | 4 | 4 |
| Example 3 | pearl barley | 4 | 3 |
| Example 4 | buckwheat | 3 | 3 |
| Example 5 | defatted wheat germ | 4 | 4 |
| Example 6 | malt | 4 | 4 |
| Example 7 | grain amaranth | 3 | 3 |
| Example 8 | rolled barley germ | 4 | 3 |
| Example 9 | rice germ | 4 | 4 |
| Example 10 | oatmeal | 3 | 3 |
| Example 11 | carob | 4 | 4 |
| Example 12 | rye | 4 | 4 |
| Example 13 | rice | 4 | 4 |
| Example 14 | green pea | 3 | 4 |
| Example 15 | brown rice | 4 | 3 |

As is obvious from Table 1, it is found that the flavor enhancer of the invention is effective for significantly imparting full body and enhancement to water and enhancing the full body and enhancement of water.

Example 16

40 g of Japanese barnyard millet powder (manufactured by Genki Town) was dipped in water of 5 times the mass of the powder, at 20° C. After thus dipped for 1 hour, a slurry was obtained. The slurry was heated at 90° C. for 30 minutes for inactivation of the endogenous enzyme and for sterilization, and then 0.16 g of Protease M (manufactured by Amano Enzyme Co., Ltd.) was added thereto and subjected to enzymatic reaction at 27° C. for 20 hours. After the reaction, it was heated at 115° C. for 60 minutes for deactivating the enzyme. After the enzyme deactivation, it was processed in the same manner as in Example 1 to obtain a flavor enhancer (16).

Example 17

In the same manner as in Example 16, a flavor enhancer (17) was produced from defatted wheat germ (manufactured by Nisshin Seifun Group Inc.).

Example 18

In the same manner as in Example 16 but excepting that malt (manufactured by Asahi Breweries, Ltd.) was dipped in water at 20° C. and then grinded with a commercially-available juice mixer (manufactured by Matsushita Electric Industrial Co., Ltd.) to obtain a slurry, a flavor enhancer (18) was produced from the malt.

Example 19

In the same manner as in Example 16 but excepting that rolled barley germ (manufactured by Natural House) was dipped in water at 20° C. and then grinded with a commercially-available juice mixer (manufactured by Matsushita Electric Industrial Co., Ltd.) to obtain a slurry, a flavor enhancer (19) was produced from the rolled barley germ.

Example 20

In the same manner as in Example 16, a flavor enhancer (20) was produced from carob powder (manufactured by Sakurai Foods Co., Ltd.).

Example 21

In the same manner as in Example 16, a flavor enhancer (21) was produced from rice (Powder Rice C1, manufactured by Glico Foods Co., Ltd.).

Sensory Evaluation 2

0.5 mg of the flavor enhancers (16) to (21) of Examples 16 to 21 were respectively added to 99.5 mg of a commercially-available beer-like alcoholic beverage, and tested for sensory evaluation by four panelists. In the sensory evaluation test, the samples were compared with a control containing no flavor enhancer and evaluated as follows.

4: extremely enriched
3: enriched
2: enriched in some degree
1: no change
0: weakened The results are shown in Table 2.

TABLE 2

| Example No. | Kind of Cereals | Full Body | Enhancement | Preference |
| --- | --- | --- | --- | --- |
| Example 16 | Japanese barnyard millet | 3.3 | 3.6 | 2.8 |
| Example 17 | defatted wheat germ | 2.9 | 3.3 | 2.5 |
| Example 18 | malt | 3.5 | 3.0 | 3.3 |
| Example 19 | rolled barley germ | 2.9 | 3.5 | 3.3 |
| Example 20 | carob | 3.3 | 2.8 | 2.8 |
| Example 21 | rice | 3.1 | 2.9 | 3.1 |

As is obvious from Table 2, it is found that, by adding the flavor enhancer of the invention to beer-like alcoholic beverage, full body and enhancement can be significantly imparted and enhanced as compared with the control containing no flavor enhancer.

Example 22

40 g of foxtail millet powder (manufactured by Genki Town) was dipped in water of 5 times the mass of the powder, at 20° C. After thus dipped for 1 hour, a slurry was obtained. The slurry was heated at 90° C. for 30 minutes for inactivation of the endogenous enzyme and for sterilization, and then 0.16 g of Umamizyme (manufactured by Amano Enzyme Co., Ltd.) was added thereto and subjected to enzymatic reaction at 27° C. for 20 hours. After the reaction, it was heated at 115° C. for 60 minutes for deactivating the enzyme. After the enzyme deactivation, it was processed in the same manner as in Example 1 to obtain a flavor enhancer (22).

Example 23

In the same manner as in Example 22 but excepting that malt (manufactured by Asahi Breweries, Ltd.) was dipped in water at 20° C. and then grinded with a commercially-available juice mixer (manufactured by Matsushita Electric Industrial Co., Ltd.) to obtain a slurry, a flavor enhancer (23) was produced from the malt.

Example 24

In the same manner as in Example 22 but excepting that rolled barley germ (manufactured by Natural House) was dipped in water at 20° C. and then grinded with a commercially-available juice mixer (manufactured by Matsushita Electric Industrial Co., Ltd.) to obtain a slurry, a flavor enhancer (24) was produced from the rolled barley germ.

Example 25

In the same manner as in Example 22, a flavor enhancer (25) was produced from carob powder (manufactured by Sakurai Foods Co., Ltd.).

Example 26

In the same manner as in Example 22, a flavor enhancer (26) was produced from rye powder (manufactured by Sakurai Foods Co., Ltd.).

Example 27

In the same manner as in Example 22, a flavor enhancer (27) was produced from rice (Powder Rice C1, manufactured by Glico Foods Co., Ltd.).

Sensory Evaluation 3

0.5 ml of the flavor enhancers (22) to (27) of Examples 22 to 27 were respectively added to 99.5 ml of commercially-available low-malt beer, and tested for sensory evaluation by four panelists. In the sensory evaluation test, the samples were compared with a control containing no flavor enhancer and evaluated as follows.

4: extremely enriched
3: enriched
2: enriched in some degree
1: no change
0: weakened The results are shown in Table 3.

TABLE 3

| Example No. | Kind of Cereals | Full Body | Enhancement | Preference |
|---|---|---|---|---|
| Example 22 | foxtail millet | 3.3 | 3.1 | 2.1 |
| Example 23 | malt | 3.5 | 3.0 | 3.1 |
| Example 24 | rolled barley germ | 3.4 | 3.1 | 3.4 |
| Example 25 | carob | 3.3 | 3.3 | 2.8 |
| Example 26 | rye | 2.6 | 2.8 | 2.8 |
| Example 27 | rice | 3.0 | 2.8 | 3.1 |

As is obvious from Table 3, it is found that, by adding the flavor enhancer of the invention to low-malt beer, full body and enhancement can be significantly imparted and enhanced as compared with the control containing no flavor enhancer.

Example 28

40 g of Japanese barnyard millet powder (manufactured by Genki Town) was dipped in water of 5 times the mass of the powder, at 20° C. After thus dipped for 1 hour, a slurry was obtained. The slurry was heated at 90° C. for 30 minutes for inactivation of the endogenous enzyme and for sterilization, and then 0.16 g of Proleather FG-F (manufactured by Amano Enzyme Co., Ltd.) was added thereto and subjected to enzymatic reaction at 27° C. for 20 hours. After the reaction, it was heated at 115° C. for 60 minutes for deactivating the enzyme. After the enzyme deactivation, it was processed in the same manner as in Example 1 to obtain a flavor enhancer (28).

Example 29

In the same manner as in Example 28, a flavor enhancer (29) was produced from foxtail millet powder (manufactured by Genki Town).

Example 30

In the same manner as in Example 28 but excepting that malt (manufactured by Asahi Breweries, Ltd.) was dipped in water at 20° C. and then grinded with a commercially-available juice mixer (manufactured by Matsushita Electric Industrial Co., Ltd.) to obtain a slurry, a flavor enhancer (30) was produced from the malt.

Example 31

In the same manner as in Example 28 but excepting that rice germ (manufactured by TORYO Co., Ltd.) was dipped in water at 20° C. and then grinded with a commercially-available juice mixer (manufactured by Matsushita Electric Industrial Co., Ltd.) to obtain a slurry, a flavor enhancer (31) was produced from the malt.

Example 32

In the same manner as in Example 28, a flavor enhancer (32) was produced from carob powder (manufactured by Sakurai Foods Co., Ltd.).

Example 33

In the same manner as in Example 28, a flavor enhancer (33) was produced from rye powder (manufactured by Sakurai Foods Co., Ltd.).

Sensory Evaluation 4

0.5 ml of the flavor enhancers (28) to (33) of Examples 28 to 33 were respectively added to 99.5 ml of commercially-available barley tea, and tested for sensory evaluation by four panelists. In the sensory evaluation test, the samples were compared with a control containing no flavor enhancer and evaluated as follows.

4: extremely enriched
3: enriched
2: enriched in some degree
1: no change
0: weakened The results are shown in Table 4.

TABLE 4

| Example No. | Kind of Cereals | Full Body | Enhancement | Preference |
|---|---|---|---|---|
| Example 28 | Japanese barnyard millet | 2.9 | 2.9 | 2.6 |
| Example 29 | foxtail millet | 3.3 | 3.1 | 2.6 |
| Example 30 | malt | 3.3 | 3.5 | 2.6 |
| Example 31 | rice germ | 3.0 | 3.1 | 2.3 |
| Example 32 | carob | 2.6 | 3.3 | 3.0 |
| Example 33 | rye | 3.1 | 2.6 | 2.8 |

As is obvious from Table 4, it is found that, by adding the flavor enhancer of the invention to barley tea, full body and enhancement can be significantly imparted and enhanced as compared with the control containing no flavor enhancer.

Comparative Example 1

Production method according to JP-A-2005-13166:

120 g of an aqueous 75% ethyl alcohol solution and 40 g commercially available Munich malt were put into a 300-ml flask, and heated in a water bath at 70° C. for 2 hours with stirring. After cooled to room temperature, the malt was removed through filtration, and 90 g of a mat extract (C) was thus obtained. Apart from the malt extract (C), other malt extracts were produced, which were a malt extract (A) extracted with an aqueous 25% ethyl alcohol solution, a malt extract (B) extracted with an aqueous 45% ethyl alcohol solution, a malt extract (D) extracted with an aqueous 93% ethyl alcohol solution, and a malt extract (E) extracted with water.

Example 34

40 g of defatted wheat germ (manufactured by Nisshin Seifun Group Inc.) was dipped in water of 8 times the mass of the powder, at 20° C. After thus dipped for 1 hour, a slurry was obtained. The slurry was heated at 90° C. for 30 minutes for inactivation of the endogenous enzyme and for sterilization, and then 0.16 g of Protease M (manufactured by Amano Enzyme Co., Ltd.) was added thereto and subjected to enzymatic reaction at 27° C. for 20 hours. After the reaction, it was heated at 115° C. for 60 minutes for deactivating the enzyme. After the enzyme deactivation, it was processed in the same manner as in Example 1 to obtain a flavor enhancer (34).

Example 35

In the same manner as in Example 34 but excepting that malt (manufactured by Asahi Breweries, Ltd.) was dipped in water at 20° C. and then grinded with a commercially-available juice mixer (manufactured by Matsushita Electric Industrial Co., Ltd.) to obtain a slurry, a flavor enhancer (35) was produced from the malt.

Example 36

In the same manner as in Example 34, a flavor enhancer (36) was produced from carob powder (manufactured by Sakurai Foods Co., Ltd.).

Example 37

In the same manner as in Example 34, a flavor enhancer (37) was produced from rye powder (manufactured by Sakurai Foods Co., Ltd.).

Example 38

In the same manner as in Example 34, a flavor enhancer (38) was produced from rice (Powder Rice C1, manufactured by Glico Foods Co., Ltd.).

Sensory Evaluation 5

0.03 mg of the flavor enhancers (34) to (38) of Examples 34 to 38, or 300 ppm of the flavor improvers (A) to (E) of Comparative Example 1 were respectively added to 99.97 mg of a commercially-available beer-like alcoholic beverage, and tested for sensory evaluation by five panelists. In the sensory evaluation test, the samples were compared with a control containing no flavor enhancer and evaluated as follows.
4: extremely enriched
3: enriched
2: enriched in some degree
1: no change
0: weakened
The results are shown in Table 5.

TABLE 5

| Example No. | Kind of Cereals | Full Body | Enhancement | Preference |
|---|---|---|---|---|
| Example 34 | defatted wheat germ | 3.0 | 2.2 | 1.8 |
| Example 35 | malt | 2.8 | 2.6 | 2.6 |
| Example 36 | carob | 2.2 | 2.5 | 2.3 |
| Example 37 | rye | 2.7 | 2.4 | 2.4 |
| Example 38 | rice | 3.0 | 2.8 | 2.5 |
| Comparative Example No. | Concentration of Ethyl Alcohol | Full Body | Enhancement | Preference |
| Comparative Example A | 25% | 1.1 | 1.2 | 0.6 |
| Comparative Example B | 45% | 1.2 | 1.6 | 0.9 |
| Comparative Example C | 75% | 1.3 | 1.6 | 1.2 |
| Comparative Example D | 93% | 1.1 | 1.0 | 0.8 |
| Comparative Example E | 0% | 1.2 | 1.6 | 1.4 |

As is obvious from Table 5, it is found that, by adding the flavor enhancer of the invention to beer-like alcoholic beverage, full body and enhancement can be significantly imparted and enhanced as compared with the control containing no flavor enhancer and with the comparative samples of Comparative Example 1.

Sensory Evaluation 6

0.03 mg of the flavor enhancers (34) to (38) of Examples 34 to 38, or 300 ppm of the flavor improvers (A) to (E) of Comparative Example 1 were respectively added to 99.97 mg of commercially-available low-malt beer, and tested for sensory evaluation by five panelists. In the sensory evaluation test, the samples were compared with a control containing no flavor enhancer and evaluated as follows.
4: extremely enriched
3: enriched
2: enriched in some degree
1: no change
0: weakened
The results are shown in Table 6.

TABLE 6

| Example No. | Kind of Cereals | Full Body | Enhancement | Preference |
|---|---|---|---|---|
| Example 34 | defatted wheat germ | 2.6 | 2.9 | 2.7 |
| Example 35 | malt | 2.7 | 2.8 | 2.7 |
| Example 36 | carob | 2.5 | 2.4 | 2.0 |
| Example 37 | rye | 2.5 | 2.3 | 2.6 |
| Example 38 | rice | 2.6 | 2.8 | 2.5 |
| Comparative Example No. | Concentration of Ethyl Alcohol | Full Body | Enhancement | Preference |
| Comparative Example A | 25% | 1.3 | 1.5 | 1.2 |
| Comparative Example B | 45% | 1.2 | 1.6 | 1.3 |
| Comparative Example C | 75% | 1.5 | 1.6 | 1.4 |
| Comparative Example D | 93% | 1.1 | 1.2 | 1.1 |
| Comparative Example E | 0% | 1.3 | 1.3 | 1.2 |

As is obvious from Table 6, it is found that, by adding the flavor enhancer of the invention to low-malt beer, full body and enhancement can be significantly imparted and enhanced as compared with the control containing no flavor enhancer and with the comparative samples of Comparative Example 1.

While the invention has been described in detail and with reference to specific embodiments thereof, it will be apparent to one skilled in the art that various changes and modifications can be made therein without departing from the scope thereof. This application is based on Japanese patent application No. 2006-220244 filed Aug. 11, 2006, the entire contents thereof being hereby incorporated by reference.

Further, all references cited herein are incorporated in their entireties.

INDUSTRIAL APPLICABILITY

The flavor enhancer of the invention can be used for enhancing the full body and enhancement of beer and beer-like beverages and beverages of a roast material, and its industrial applicability is great.

The invention claimed is:

1. A process for producing a flavor enhancer for beer, a beer-like beverage or a beverage of a roasted material, which comprises in the following order:
    (1) dipping ground cereal in water at 4° C. to 90° C. for 10 minutes to 4 hours, wherein the ratio by weight of cereal/water is from 90/10 to 1/99;
    heating the ground cereal at 55° C. to 121° C. for 5 minutes to 70 minutes to deactivate an endogenous enzyme in the ground cereal;
    (2) treating the deactivated ground cereal with a protease, wherein the amount of the protease is 0.001 to 10% by weight of the ground cereal; and
    (3) recovering an extract, thus obtaining a flavor enhancer, wherein the cereal is at least one member selected from the group consisting of Japanese barnyard millet, foxtail millet, pearl barley, buckwheat, defatted wheat germ, malt, grain amaranth, rolled barley germ, rice germ, oatmeal, carob, rye, rice, green pea, and brown rice.

2. A process for enhancing flavor of beer, a beer-like beverage or a beverage of a roasted material, comprising adding a flavor enhancer for beer, a beer-like beverage or a beverage of a roasted material, which is obtained by the process according to claim 1, to the beer, beer-like beverage or beverage of a roasted material.

3. A process for enhancing flavor of beer, a beer-like beverage or a beverage of a roasted material, comprising adding a flavor composition comprising a flavor enhancer for beer, a beer-like beverage or a beverage of a roasted material, which is obtained by the process according to claim 1, to the beer, beer-like beverage or beverage of a roasted material.

4. The process according to claim 1, wherein in step (1), the ratio by weight of cereal/water is from 70/30 to 1/99.

5. The process according to claim 1, wherein the ground cereal is heated at 60° C. to 115° C.

6. The process according to claim 1, wherein the ground cereal is heated at 65° C. to 110° C.

7. The process according to claim 1, wherein the ground cereal is heated at 90° C. to 121° C.

8. The process according to claim 1, wherein the ground cereal is heated for 10 minutes to 60 minutes.

9. The process according to claim 1, which comprises deactivating the protease after the step (2) and before the step (3).

10. The process according to claim 1, wherein the cereal is selected from the group consisting of defatted wheat germ, malt, rice germ, carob, rye, rice and green pea.

11. The process according to claim 1, wherein the cereal is dipped in water at 4° C. to 80° C. for 30 minutes to 3 hours.

12. The process according to claim 1, wherein the amount of the protease is 0.01 to 5% by weight of the ground cereal.

* * * * *